(12) United States Patent
Stewart et al.

(10) Patent No.: US 6,551,818 B2
(45) Date of Patent: Apr. 22, 2003

(54) BIOLOGICAL FILTER STRUCTURES

(75) Inventors: William C. Stewart, Gladstone, OR (US); Randall R. Thom, Tualatin, OR (US); Paul C. John, Beaverton, OR (US)

(73) Assignee: Bio-Reaction Industries, LLC, Tualatin, OR (US)

( * ) Notice: Subject to any disclaimer, the term of this patent is extended or adjusted under 35 U.S.C. 154(b) by 0 days.

(21) Appl. No.: 09/882,214

(22) Filed: Jun. 14, 2001

(65) Prior Publication Data

US 2001/0053546 A1 Dec. 20, 2001

Related U.S. Application Data

(60) Provisional application No. 60/212,144, filed on Jun. 16, 2000.

(51) Int. Cl.[7] .................... C12M 1/12; C12M 3/06; B01D 39/14
(52) U.S. Cl. .................. 435/295.3; 435/266; 210/264; 210/323.1; 210/323.2; 95/45; 55/343; 55/350.1; 55/398; 55/500.27
(58) Field of Search ............... 435/266, 289.1, 435/295.3, 299; 210/150, 263, 264, 323.1, 323.2, 348, 398, 500.27; 95/45; 53/342, 343, 350.1

(56) References Cited

U.S. PATENT DOCUMENTS

| | | | | |
|---|---|---|---|---|
| 4,908,128 A | * | 3/1990 | Chiba | 210/150 |
| 4,985,182 A | * | 1/1991 | Basse et al. | 210/150 |
| 5,609,753 A | * | 3/1997 | Prazmowski | 210/150 |
| 5,772,870 A | * | 6/1998 | Basse | 156/196 |
| 5,882,510 A | * | 3/1999 | Basse et al. | 210/150 |
| 6,255,102 B1 | * | 7/2001 | Hallsten | 34/237 |

FOREIGN PATENT DOCUMENTS

DE            3517523 C1  *  12/1986

* cited by examiner

*Primary Examiner*—David A. Redding
(74) *Attorney, Agent, or Firm*—John Smith-Hill; Smith-Hill and Bedell

(57) ABSTRACT

A cartridge for holding compost in a biofilter is substantially uniform in cross section perpendicular to the axis of the cartridge and has a sidewall formed with openings that are small enough to substantially retain the compost in the cartridge yet large enough to allow filaments of bacteria present in the compost to project through the openings. The cartridge is of cross-sectional form such that multiple cartridges can be placed side-by-side in an array with passages between each cartridge and adjacent cartridges.

22 Claims, 4 Drawing Sheets

BIOLOGICAL FILTER STRUCTURES

CROSS-REFERENCE TO RELATED APPLICATION

This application claims benefit of Provisional Application No. 60/212,144 filed Jun. 16, 2000.

BACKGROUND OF THE INVENTION

This invention relates to biological filter structures.

Volatile organic compounds (VOCs) of various kinds are widely used in many industrial processes. Typical VOCs include acetone, benzene, toluene, xylene and methyl ethyl ketone (MEK). Disposal of VOCs or substances containing VOCs represents a significant problem for many industries.

A known technique for disposal and/or destruction of VOCs from certain sources is to allow any volatilizable compounds present in the materials to evaporate at ambient temperature into an effectively unconfined space. Since the VOCs evaporate at a fairly slow rate, and the space into which the VOCs evaporate is effectively unconfined, the concentration of VOCs in the atmosphere in the vicinity of the residue material does not normally become bothersome, but this practice nevertheless contributes to atmospheric pollution.

U.S. Pat. No. 5,518,920 discloses apparatus for capturing air that contains VOCs in the vapor phase and for processing the air in order to convert the VOCs to a nontoxic form. In particular, U.S. Pat. No. 5,518,920 discloses a biological filter unit comprising a cabinet containing biologically active filter material. The filter material includes plant compost containing microorganisms that have an affinity for VOCs and consume VOCs as nutrients. The cabinet has an inlet opening at the bottom for supply of feed air and an exhaust opening at the top. Feed air containing VOCs is supplied to the inlet opening and flows upwards through the filter. The microorganisms capture and consume the VOCs, and accordingly, under appropriate operating conditions, the concentration of VOCs in the exhaust air is substantially less than the concentration of VOCs in the feed air.

In order to provide the filter unit with sufficient resilience to withstand heavy loadings of VOCs, it is necessary that the filter unit should contain a large population of microorganisms, which in turn requires a large quantity of compost. In the filter unit disclosed in U.S. Pat. No. 5,518,920, the compost is supported in generally horizontal beds. Cost considerations dictate that the number of beds be kept to a minimum, and consequently in order to provide the required quantity of compost, the beds are fairly thick. Specifically, the beds may have a depth of up to about twelve inches.

It is believed that a major part of the biological activity of a biofilter takes place at the surface of the mass of filter material, where the biomatrix is exposed to the incoming pollutant-laden air. Accordingly, it is desirable to maximize the ratio of the surface area of the filter bed to the volume of compost material. A possible disadvantage of the biological filter unit disclosed in U.S. Pat. No. 5,518,920 is that the surface area of the compost beds relative to the volume of the beds is rather small. A further possible disadvantage is that a thick bed of biofilter material results in a rather large back pressure, requiring use of a large amount of energy to maintain the flow of air through the filter bed.

SUMMARY OF THE INVENTION

In accordance with a first aspect of the invention there is provided an article of manufacture comprising a hollow cartridge for holding compost in a biofilter, the cartridge having two ends spaced apart along an axis of the cartridge, the cartridge being substantially a regular polygon in cross section perpendicular to the axis of the cartridge and having a side wall at each side of the polygonal cross section, the side walls being formed with openings that are small enough to substantially retain the compost in the cartridge yet large enough to allow filaments of bacteria present in the compost to project through the openings, the polygonal cross-sectional form of the cartridge being such that the cartridge can be placed side-by-side with a plurality of other substantially identical cartridges in an array such that each side wall of the cartridge is in parallel confronting relationship with a side wall of one of the other cartridges, and a first side wall of the cartridge being provided with a projecting baffle structure which holds the first side wall away from a confronting side wall of an adjacent cartridge in such an array, the baffle structure defining a serpentine path for flow of air between said first side wall of the cartridge and the confronting side wall of the adjacent cartridge.

In accordance with a second aspect of the invention there is provided an article of manufacture comprising a hollow cartridge for holding compost in a biofilter, the cartridge having two ends spaced apart along an axis of the cartridge, the cartridge being substantially rectangular in cross section perpendicular to said axis and having four side walls, the side walls being formed with openings that are small enough to substantially retain the compost in the cartridge yet large enough to allow filaments of bacteria present in the compost to project through the openings, and a first side wall of the cartridge being generally flat and a second side wall being provided with a projecting baffle structure which defines a serpentine path over said second side wall.

In accordance with a third aspect of the invention there is provided an assembly of substantially identical hollow cartridges for holding compost in a biofilter, each cartridge having two ends spaced apart along an axis of the cartridge and being substantially a regular polygon in cross section perpendicular to the axis of the cartridge and having a side wall at each side of the polygonal cross section, the side walls being formed with openings that are small enough to substantially retain the compost in the cartridge yet large enough to allow filaments of bacteria present in the compost to project through the openings, the polygonal cross-sectional form of the cartridge being such that the cartridges can be placed side-by-side in an array such that each side wall of a first cartridge is in parallel confronting relationship with a side wall of one of the other cartridges.

In accordance with a fourth aspect of the invention there is provided an assembly of substantially identical cartridges for holding compost in a biofilter, wherein each cartridge has two ends spaced apart along an axis of the cartridge and is substantially uniform in cross section perpendicular to the axis of the cartridge, has an endless sidewall formed with openings that are small enough to substantially retain the compost in the cartridge yet large enough to allow filaments of bacteria present in the compost to project through the openings, and is of cross-sectional form such that the cartridges can be placed side-by-side in an array with passages between each cartridge and adjacent cartridges.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
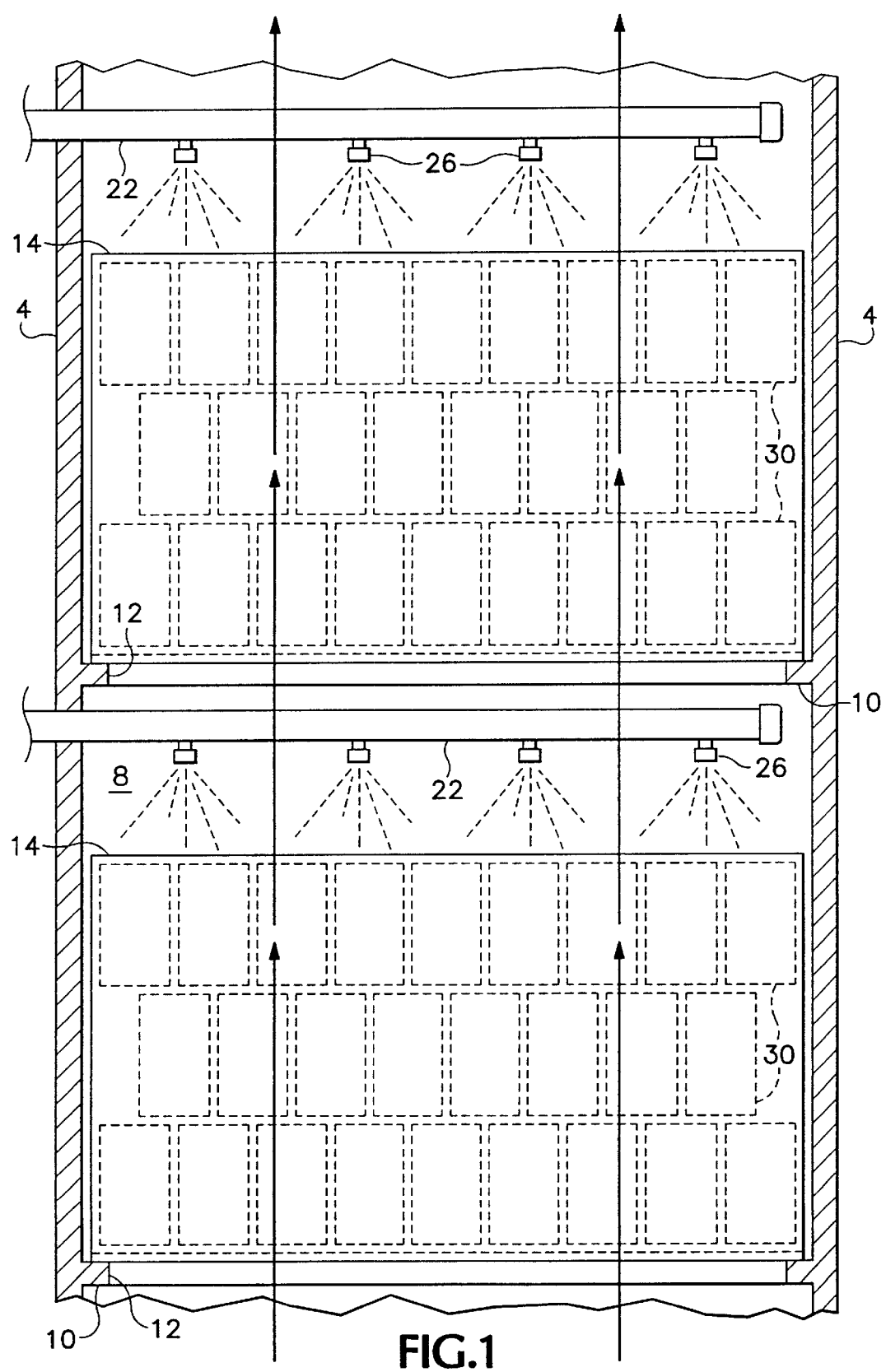
FIG. 1 is a partial sectional view of a first biofilter in accordance with the invention.

The biofilter shown in FIG. 1 includes a cabinet having side walls 4 and a top wall (not shown) formed with an exhaust opening. The cabinet has an inlet opening (not shown) at a location below the part shown in FIG. 1. The cabinet has a back wall 8 and a front wall (not shown) formed with a door for providing access to the interior of the cabinet.

Horizontal plates 10 are mounted in the cabinet and support respective baskets 14. The baskets are rectangular when viewed in plan, and each basket has an open top, solid walls and a perforated bottom. Each plate 10 has an opening 12 which registers with the bottom of the basket resting on the plate, and a peripheral seal (not shown) is provided between the each plate and the basket that rests on the plate.

Two spray tubes 22 extend through one of the side walls 4. Each spray tube is provided with spray nozzles 26 and is connected to a source of water under pressure for spraying water onto the two baskets 14.

Figure 2:
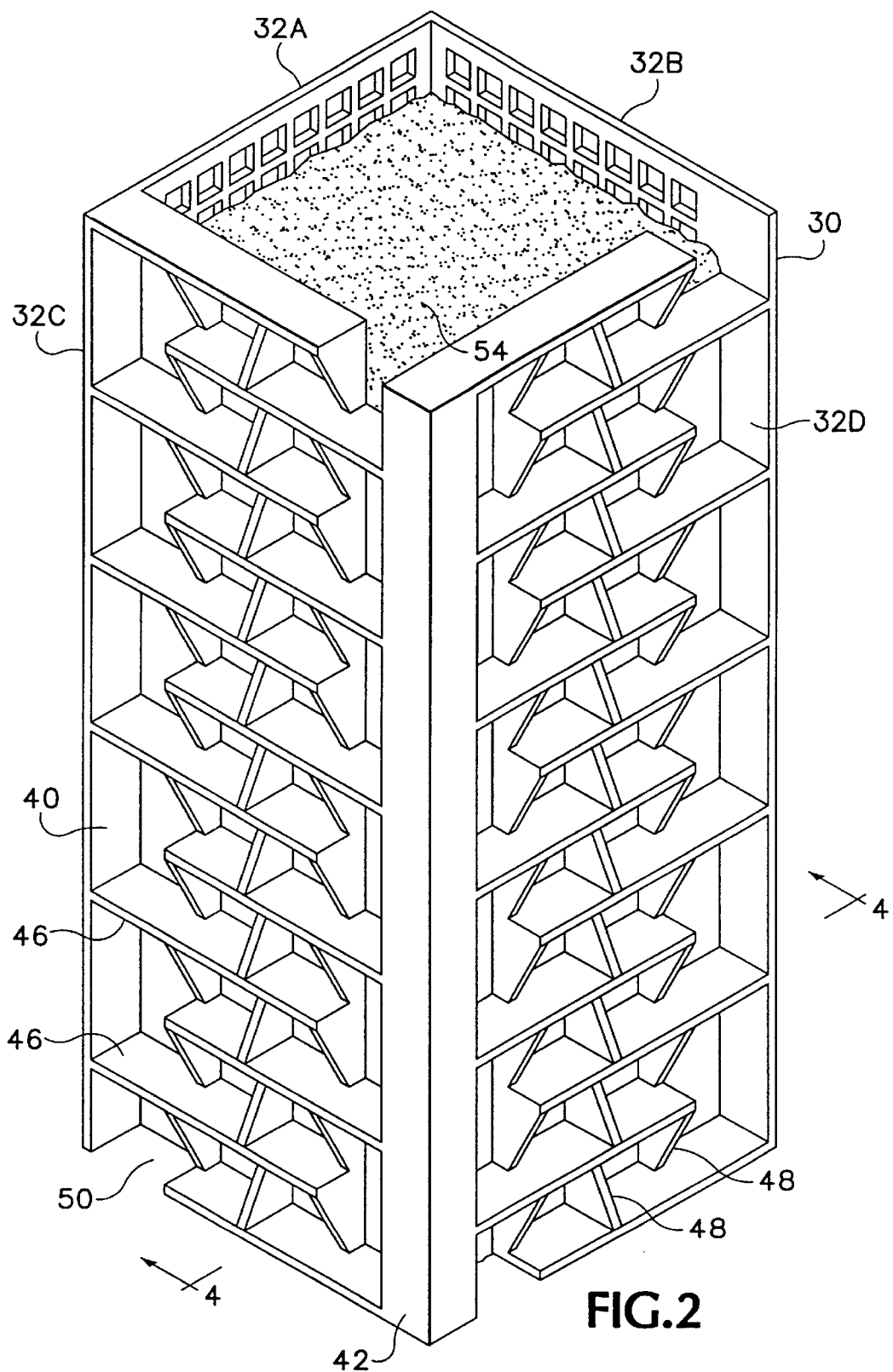
FIG. 2 is a perspective view of one of the cartridges of the biofilter.
Figure 3:
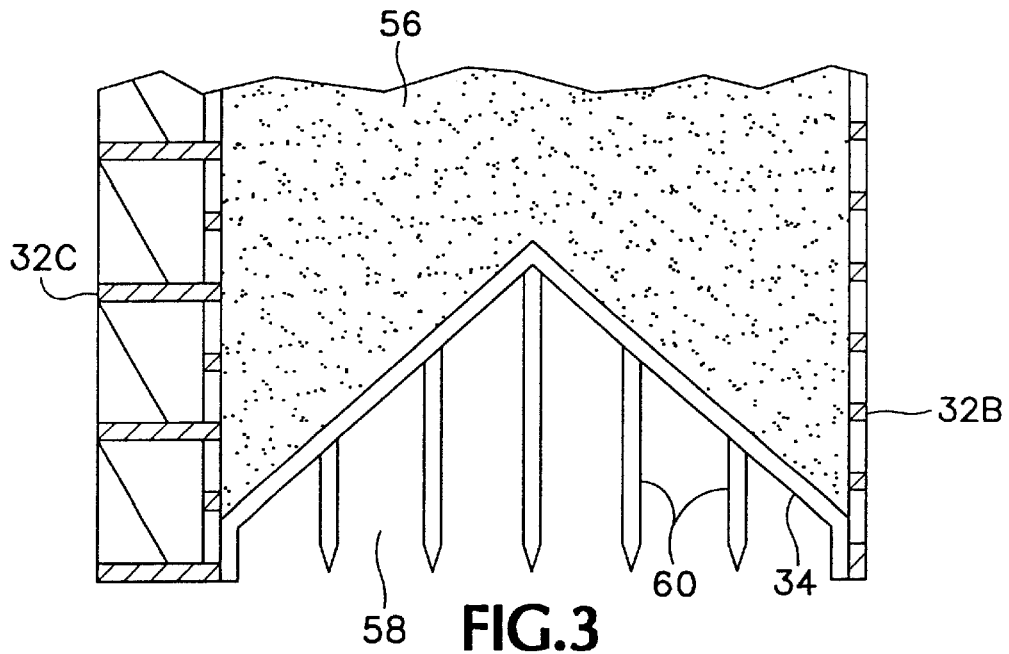
FIG. 3 is a partial sectional view of the cartridge taken on the line 3–3 of FIG. 2.
Figure 4:
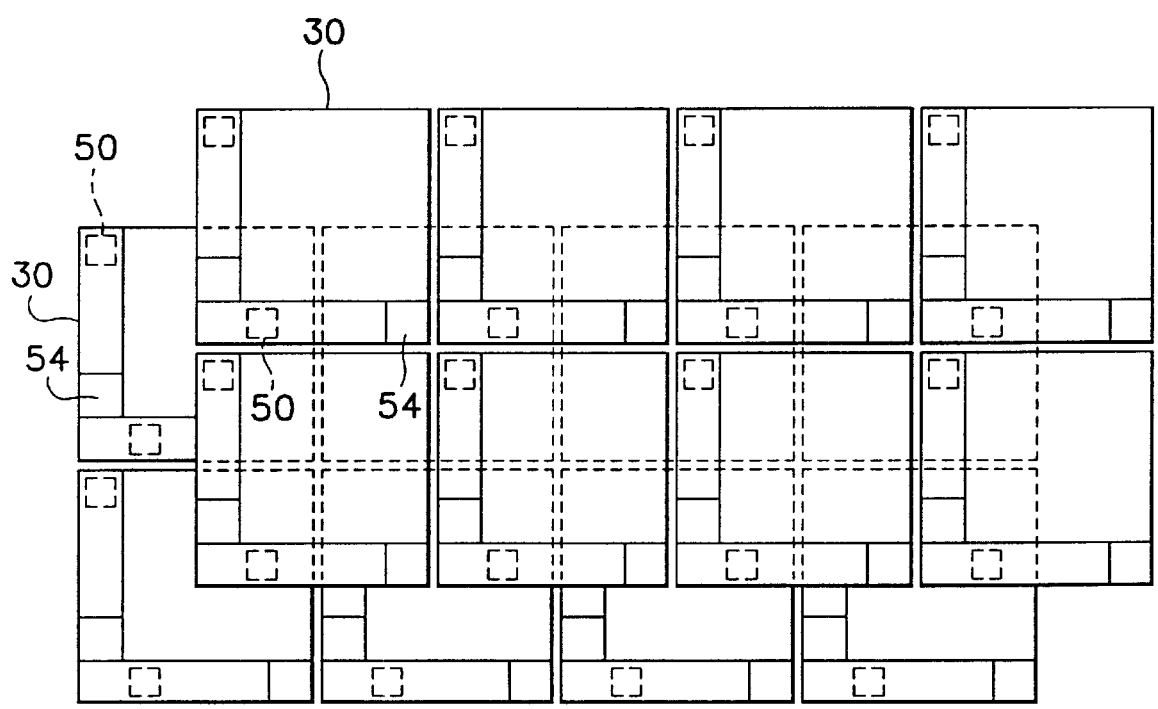
FIG. 4 is a partial top plan view of one of the filter beds of the biofilter shown in FIG. 1.

Each of the baskets 14 contains multiple filter cartridges 30. Referring to FIGS. 2 and 3, each cartridge is generally parallelepipedal in form, having four perforated side walls 32, a perforated bottom wall 34 and an open top 36. Two adjacent side walls 32A and 32B are generally flat, whereas the other two adjacent side walls 32C and 32D each have a baffle structure projecting therefrom. The perforations in the walls 32C and 32D are not shown in FIG. 2 but they can be seen in FIG. 3. Referring to FIG. 1, the cartridges 30 are placed in the baskets 14 in two or more layers, with the side walls of each cartridge aligned along two mutually perpendicular horizontal axes, as shown in FIG. 4. The cartridges of each upper layer are offset along both horizontal axes relative to the cartridges of the layer immediately below, so that a cartridge of an upper layer partially overlaps up to four cartridges of the layer immediately below.

Referring again to FIG. 2, the baffle structure at each of the side walls 32C and 32D includes two longitudinal walls 40 and 42 defining therebetween a channel which extends upwards along the side wall of the cartridge from the lower end of the cartridge to the upper end of the cartridge. When the cartridges are installed in the basket, with the baffle structure against the side wall 32A or 32B of an adjacent cartridge, the longitudinal walls 40 and 42 bound a passage for flow of air between the cartridges from an inlet opening 50 at the lower end of the cartridge to an outlet opening 54 at the upper end of the cartridge. Therefore, although each cartridge abuts its neighboring cartridges quite closely, air can nevertheless pass between adjacent cartridges.

The baffle structure also includes lateral walls 46, each extending only part of the distance between the two longitudinal walls 42 and 44, so that the path from the inlet opening 50 to the outlet opening 54 is of a meandering or serpentine form. In addition, the baffle structure includes transverse baffles 48 on each segment of the meandering path. The free edge of each baffle 48 is inclined, successive baffles along a segment of the meandering path being inclined in opposite directions, and consequently air that flows along the meandering path is turbulent and mixes thoroughly.

Referring to FIG. 3, the perforated bottom wall 34 is recessed relative to the lower edges of the side walls 32. In the case of the cartridge illustrated in FIG. 3, the bottom wall has a generally pyramidal form composed of ribs extending upwards from the corners of the interior space of the cartridge towards the center of the interior space. However, in other cases the bottom wall may be concave. In any event, the space beneath the bottom wall 34 forms a mixing chamber 58. It will be understood from FIG. 4 that the outlet openings of two of the passages between cartridges in a lower layer debouch into the mixing chamber 58 of a cartridge in an upper layer, and accordingly the mixing chamber is well supplied with air. Air that enters the mixing chamber beneath a given cartridge flows under the lower ends of the side walls of the cartridge and enters the passages between the side walls of the cartridge and the adjacent cartridges.

Each cartridge 30 contains a mass 56 of compost. The compost is made up of particles that tend to clump together and bridge gaps, and accordingly the compost does not escape from the cartridge through the perforations in the side walls or bottom wall. The compost contains a population of microorganisms that capture and consume VOCs and convert the VOCs to nontoxic form, such as carbon dioxide and water.

When an upward flow of air containing VOCs in the vapor phase is induced in the cabinet, the air flows through the opening in the plate 12 towards the bottom of the basket resting on the plate. The peripheral seal prevents the air from flowing around the sides of the basket and ensures that the air flows upwards though the perforated bottom of the basket. A small proportion of the air flows upwards through the porous mass of compost in the cartridges, but most of the air takes the path of least resistance and flows through the passages between the cartridges. In FIG. 4, the width of the gaps between adjacent cartridges is exaggerated for clarity of illustration, and in fact the adjacent cartridges abut closely so that air entering the passage through the inlet opening 50 is constrained to follow the serpentine path defined by the lateral walls 46. The turbulent air flowing through the passage between two adjacent cartridges along the serpentine path washes against the compost that is exposed through the openings in the side walls of the cartridges.

The microorganisms that inhabit compost and consume VOCs typically interact with VOCs in the air through filaments or tendrils that project into the free air from the mass of compost inhabited by the microorganisms. The structure of the cartridge provides a large surface area from which filaments can project into the free air. Because the air passes between the cartridges, and washes against the compost that is exposed through the openings in the side walls of the cartridges, there is an efficient interaction between the VOCs in the air and the microorganism filaments projecting into the passage.

Referring again to FIG. 3, optional pins or rods 60 extend downwards from the ribs into the mixing chamber 58. The microorganism filaments extend into the mixing chamber and are supported by the pins. Accordingly, there is efficient interaction between the VOCs and the microorganism filaments in the mixing chamber also.

It is important to proper operation of the illustrated biofilter that the compost in the cartridges 30 be kept moist. This is accomplished by supplying water under pressure to the spray tubes 22 for spraying from the nozzles 26 onto the contents of the two baskets. Water that permeates down through the mass of compost in a cartridge in an upper layer encounters the ribs that form the bottom wall 34 of the cartridge. Some of the water runs down the pins 60 of the cartridge in the upper layer and drips directly down onto the cartridges in the lower layer, but some water tends to flow along the ribs to the corners of the base of the cartridge in the upper layer before dripping from that cartridge. By virtue of the offset of the cartridges in the upper layer relative to the cartridges in the layer immediately below, the water that drips from a cartridge in the upper layer is distributed over four cartridges in the lower layer and is deposited preferentially near the centers of the masses of compost in the cartridges in the lower layer, which is desirable with respect to efficient watering of the compost and minimization of loss through evaporation.

The cartridge is made of a hard synthetic polymer material, such as polypropylene. Other materials that are not degraded by contact with the VOCs being processed are also suitable. The cartridge structure provides support for the biofilter matrix, so that the matrix at the bottom of a basket is not compressed by the weight of material thereabove, and by distributing the biofilter matrix among numerous cartridges, the ratio of surface area to volume is increased substantially as compared with the arrangement shown in U.S. Pat. No. 5,518,920.

By virtue of the filter material being contained in discrete cartridges, the maximum continuous depth of filter material is limited by the height of the cartridges. Consequently, if the cross-sectional area of the array of filter cartridges were A square inches and the cartridges were, for example, eight inches tall and there were three layers of cartridges, a filter bed having a volume of approximately A times 24 cubic inches would be provided, yet the maximum height of the filter material through which air might be required to pass is only eight inches. Moreover, in fact the air is not required to penetrate through the filter material because it passes through the passageways between the cartridges. The present invention provides a large volume of compost, which is desirable with respect to resilience, without necessitating that it be in a relatively small number of homogenous beds, such that it presents a high back pressure to air flowing therethrough. Also, by providing the compost in multiple cartridges the surface area to volume ratio of the compost is increased relative the case in which the compost is in relatively thick and homogeneous beds, as described in U.S. Pat. No. 5,518,920.

Because the filter provides a relatively low resistance to air flow, for a given pressure difference between the inlet and the outlet the speed of air flow through the filter is increased relative to the speed of air flow through the filter of U.S. Pat. No. 5,518,920. Nevertheless the filter unit shown in FIG. 1 provides favorable results because of the high ratio of surface area to volume of the compost.

Figure 5:
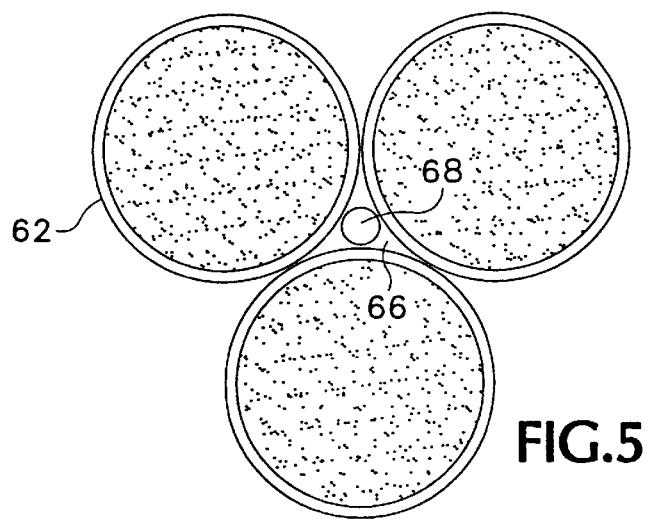
FIG. 5 is a partial top plan view of a filter bed in a second biofilter in accordance with the invention.
Figure 6:
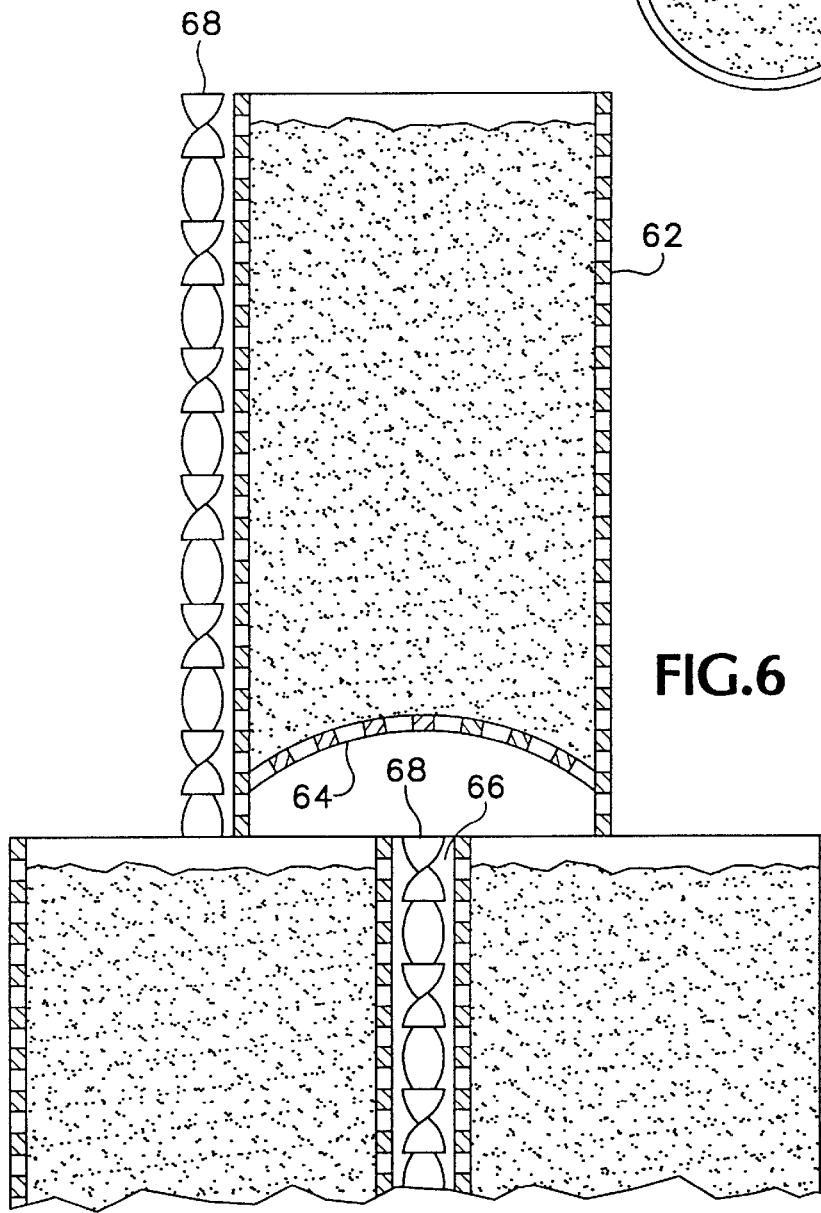
FIG. 6 is a partially cut away side view of the filter bed shown in FIG. 5.

FIGS. 5 and 6 illustrate a modification of the cartridge shown in FIGS. 1–4. In accordance with FIGS. 5 and 6, the cartridge is cylindrical in form, having an endless perforated side wall 62, and has a perforated concave bottom wall 64. When the cartridges are packed together in a basket, a deltoid or tricuspid cylindrical space 66 is defined between a group of three cartridges such that each cartridge contacts the other two cartridges of the group. The side wall 62 is of uniform structure around the cartridge, and a separate mixing insert 68 is placed in the tricuspid cylindrical space. The mixing insert has a segmented spiral vane with successive segments of opposite hand and induces turbulence in air flowing upward through the space 66. This causes efficient mixing of the air and efficient washing of the compost with the air.

It will be appreciated that the invention is not restricted to the particular embodiments that have been described, and that variations may be made therein without departing from the scope of the invention as defined in the appended claims and equivalents thereof. For example, although the invention has been described with reference to cartridges that are oriented vertically, the invention is not restricted to the cartridges being oriented vertically. In the case of the cartridges being oriented vertically, the air flows generally parallel to the central axes of the cartridges, whereas in the case of the cartridges being oriented horizontally, the air flows generally perpendicular to the central axes of the cartridges. Further it is desirable in this case that a cartridge be resistant to compression perpendicular to its central axis. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. An article of manufacture comprising:
   a hollow cartridge for holding compost in a biofilter, the cartridge having two ends spaced apart along an axis of the cartridge,
   the cartridge being substantially a regular polygon in cross section perpendicular to the axis of the cartridge and having a side wall at each side of the polygonal cross section,
   the side walls being formed with openings,
   the polygonal cross-sectional form of the cartridge being such that the cartridge can be placed side-by-side with a plurality of other substantially identical cartridges in an array such that each side wall of the cartridge is in parallel confronting relationship with a side wall of one of the other cartridges, and
   a first side wall of the cartridge being provided with a projecting baffle structure which holds the first side wall away from a confronting side wall of an adjacent cartridge in such an array, the baffle structure defining a serpentine path for flow of air between said first side wall of the cartridge and the confronting side wall of the adjacent cartridge.

2. An article of manufacture according to claim 1, wherein the cartridge is resistant to compression parallel to the axis of the cartridge.

3. An article of manufacture comprising:
   a hollow cartridge for holding compost in a biofilter, the cartridge having two ends spaced apart along an axis of the cartridge,
   the cartridge being substantially rectangular in cross section perpendicular to said axis and having four side walls,
   the side walls being formed with openings, and
   a first side wall of the cartridge being generally flat and a second side wall being provided with a projecting baffle structure which defines a serpentine path over said second side wall.

4. An article of manufacture according to claim 3, wherein the cartridge is resistant to compression parallel to the axis of the cartridge.

5. An article of manufacture according to claim 3, wherein both the first side wall and a third side wall of the cartridge are generally flat and both the second side wall and the fourth side wall of the cartridge are provided with baffle structures.

6. An article of manufacture according to claim 5, wherein the first and third side walls of the cartridge are mutually adjacent.

7. An article of manufacture according to claim 3, wherein the baffle structure has first and second longitudinal walls extending along opposite respective edges of the second side wall of the cartridge and a plurality of lateral walls each extending from one of the first and second longitudinal walls towards the other of the first and second longitudinal walls.

8. An article according to claim 7, wherein the baffle structure further includes transverse walls extending between adjacent lateral walls for imparting turbulence to air flowing along the serpentine path.

9. An assembly of substantially identical hollow cartridges for use in a biofilter, each cartridge having two ends spaced apart along an axis of the cartridge and being substantially a regular polygon in cross section perpendicular to the axis of the cartridge and having a side wall at each aide of the polygonal cross section, each cartridge containing a mass of compost with microorganisms present therein, the side walls of each cartridge being formed with openings, and the polygonal cross-sectional form of the cartridge being such that the cartridges can be placed side-by-side in an array such that each side wall of a first cartridge is in parallel confronting relationship with a side wall of one of the other cartridges, and wherein the microorganisms present in the compost have filaments and the openings in the sidewalls of each cartridge are small enough to substantially retain the compost in the cartridge yet large enough to allow the filaments of the microorganisms present in the compost to project through the openings.

10. An assembly according to claim 9, wherein the cartridge is resistant to compression parallel to the axis of the cartridge.

11. An assembly according to claim 9, wherein a first side wall of each cartridge is provided with a projecting baffle structure which holds the first side wall away from a confronting side wall of an adjacent cartridge in the array.

12. An assembly according to claim 11, wherein the baffle structure defines a serpentine path for flow of air between said first side wall of the cartridge and the confronting side wall of the adjacent cartridge.

13. An assembly according to claim 11, wherein the baffle structure includes two opposite longitudinal walls at respective edges of the first side wall and a plurality of lateral walls each extending from one of the longitudinal walls towards the other longitudinal wall.

14. An assembly according to claim 10, wherein the cartridges are substantially rectangular in cross-section and first and second sidewalls of each cartridge are generally flat and third and fourth sidewalls of the cartridge are provided with respective projecting baffle structures.

15. An assembly according to claim 9, wherein the cartridges are in upper and lower layers, the cartridges in the upper layer being offset from the cartridges in the lower layer along two mutually perpendicular horizontal axes.

16. An assembly according to claim 9, wherein each cartridge includes a perforated bottom wall and a mixing chamber is defined below the bottom wall between the side walls of the cartridge.

17. An assembly of substantially identical cartridges for use in a biofilter, wherein each cartridge:

contains a mass of compost with microorganisms present therein, has two ends spaced apart along an axis of the cartridge and is substantially uniform in cross section perpendicular to the axis of the cartridge, has an endless sidewall formed with openings, and is of cross-sectional form such that the cartridges can be placed side-by-side in an array with passages between each cartridge and adjacent cartridges.

18. An assembly according to claim 17, where each cartridge is resistant to compression parallel to the axis of the cartridge.

19. An assembly according to claim 17, including a mixing insert in the passage between a cartridge and adjacent cartridges for inducing turbulence in air flowing through the passage.

20. An assembly according to claim 17, wherein the cartridges are substantially circular in cross-sectional form.

21. An assembly according to claim 17, wherein the cartridges are substantially circular in cross-sectional form and are arranged so that a passage is bounded by three cartridges.

22. An assembly according to claim 17, wherein the microorganisms present in the compost have filaments and the openings in the endless sidewall of each cartridge are small enough to substantially retain the compost in the cartridge yet large enough to allow the filaments of the microorganisms present in the compost to project through the openings.

* * * * *